Oct. 10, 1950 W. R. HARDING ET AL 2,525,486
CONSTANT POTENTIAL EXCITER
Filed June 30, 1947 2 Sheets-Sheet 1

WITNESSES:
Robert C Baird

INVENTORS
William R. Harding and
Martin H. Fisher.
BY
Paul E. Friedemann
ATTORNEY Patented Oct. 10, 1950

2,525,486

UNITED STATES PATENT OFFICE 2,525,486

CONSTANT POTENTIAL EXCITER

William R. Harding, East Aurora, N. Y., and Martin H. Fisher, Pittsburgh, Pa., assignors to Westinghouse Electric Corporation, East Pittsburgh, Pa., a corporation of Pennsylvania Application June 30, 1947, Serial No. 758,198

5 Claims. (Cl. 322—62)

Our invention relates to systems of control for direct-current generators, and more particularly to systems of control for two-circuit armature exciters to control the voltage output thereof.

American manufacturers, particularly now when exports of electric equipment are extensive, are often called upon to supply motor-generator sets that are usable on either 50 cycle alternating current or on 60 cycle alternating current. If the direct-current exciter driven by the motor of the motor-generator set is designed for a given voltage at 50 cycles, it is apparent that the exciter voltage will rise unduly when the motor is operated from a 60 cycle supply. To prevent excessive voltage changes of an exciter when called upon to operate at a higher speed formerly required notching of the main poles. This notching changes the section of the pole pieces and the poles were caused to become saturated at the higher speed insuring good voltage regulation at the higher speed and little voltage change due to the higher speed and due to temperature changes. Removal of the main poles for notching is a rather laborious task and in consequence an expensive task. Customers are hesitant to pay for such modifications.

One broad object of our invention is the provision of exciters having good voltage regulation for either of two speeds.

Another broad object of our invention is the provision of a self-excited direct-current generator having good voltage regulation and substantially the same voltage output though operated at any one of several selected speeds.

A somewhat specific object of our invention is the provision of a control, for a direct-current generator of the self-excited type and being of the type having a two-circuit armature, that provides for a constant voltage output though the generator is operated at either of two different speeds.

A still other somewhat specific object of our invention is the provision of a constant voltage direct-current generator that does not materially change its external characteristic with changes in speed of its operation, that manifests a minimum voltage change due to changes in temperature of the machine.

Other objects and advantages will become more apparent from a study of the following specification and the accompanying drawing, in which.

Figure 1:
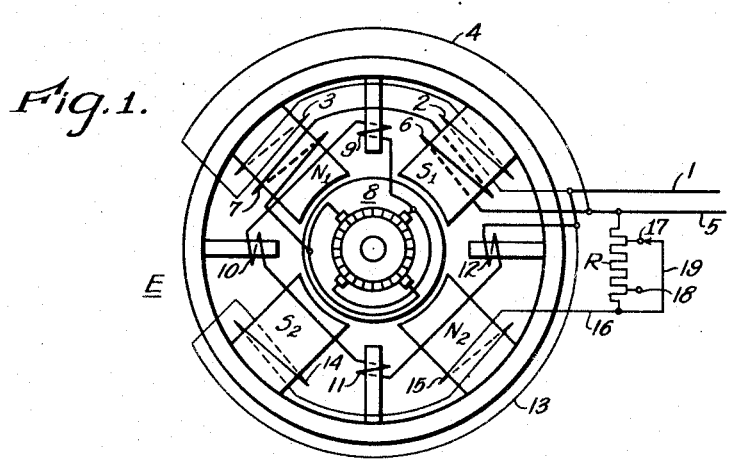
Figure 1 is a diagrammatic showing of the connections used with our contribution to the art.
Figures 2, 3:
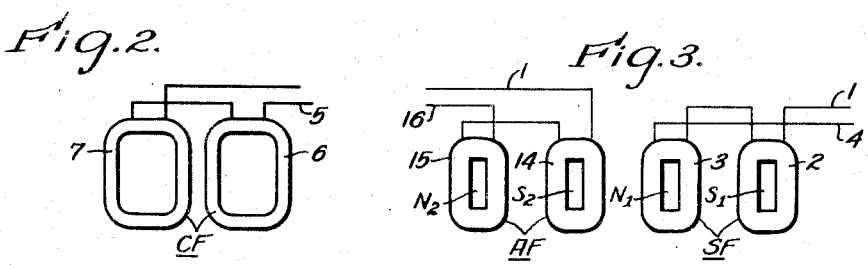
Figs. 2, 3 and 4 show the winding directions of the poles used on the machine shown in Fig. 1.
Figure 4:
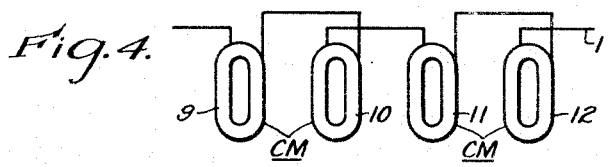
Figure 5:
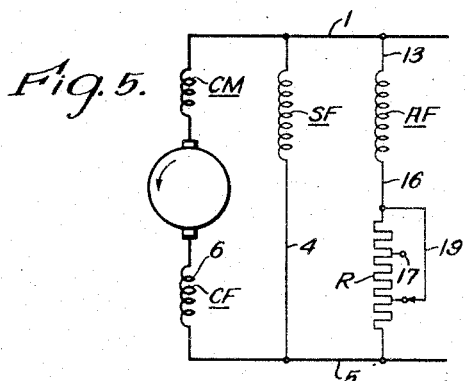
Fig. 5 is a so-called straight-line diagram of the showing of Fig. 1.

The exciter shown in Fig. 1 is a standard four-pole exciter using a two-circuit armature, as shown. The circuits are arranged and controlled to accomplish the novel results broadly stated in the objects.

Assuming that leads 1 and 5 are the output leads of the exciter, namely, the leads to which the external circuits are to be connected and across which leads the voltage is to remain constant even though the speed at which the exciter is operated is changed from roughly 1450 R. P. M. to roughly 1750 R. P. M. The motor of the motor-generator set of which the machine E is the generator is not shown because the motor is no part of our invention. It suffices to know that the exciter E is to operate either at 1450 R. P. M., corresponding to a 50 cycle source for the motor driving the exciter, or at 1750 R. P. M., corresponding to a 60 cycle source for the motor.

The field SF, except for the heavy series field CF and the commutating field CM, is connected directly across the armature terminals and the field design is such that, for the ampere turns chosen, the main poles $N_1$ and $S_1$ during normal operation become saturated. The loop circuit for this field through the two-circuit armature may be traced from lead 1, which we shall consider the positive lead, through field SF comprising pole coil 2 on pole $S_1$ and pole coil 3 on pole $N_1$, and conductor 4 to lead 5, the exciter compounding field CF comprising pole coil 6 on pole $S_1$ and pole coil 7 on pole $N_1$, the two-circuit armature 8, and the commutating winding CM comprising the individual windings 9, 10, 11 and 12, back to lead 1. From the loop circuit just traced, it is apparent that the leads 1 and 5 do represent the leads from the exciter armature to which the outside or load circuit of the exciter is to be connected.

The circuit for the adjustable field AF comprising the pole windings 14 and 15 may be traced from the lead 1 through conductor 13, the adjustable field AF comprising the pole coil 14 on the pole piece $S_2$, the pole coil 15, on the pole piece $N_2$, and conductor 16 through the resistor R to the negative lead 5.

The two top pole pieces $N_1$ and $S_1$ are operated fully saturated, whereas the excitation of the windings on the pole pieces $N_2$ and $S_2$ is such as not to saturate these pole pieces and, further, the resistance R is so adjusted that the sum of the fluxes produced by the poles $S_1$, $N_1$, $S_2$ and $N_2$ is of sufficient value to produce the output voltage required.

Figure 6:
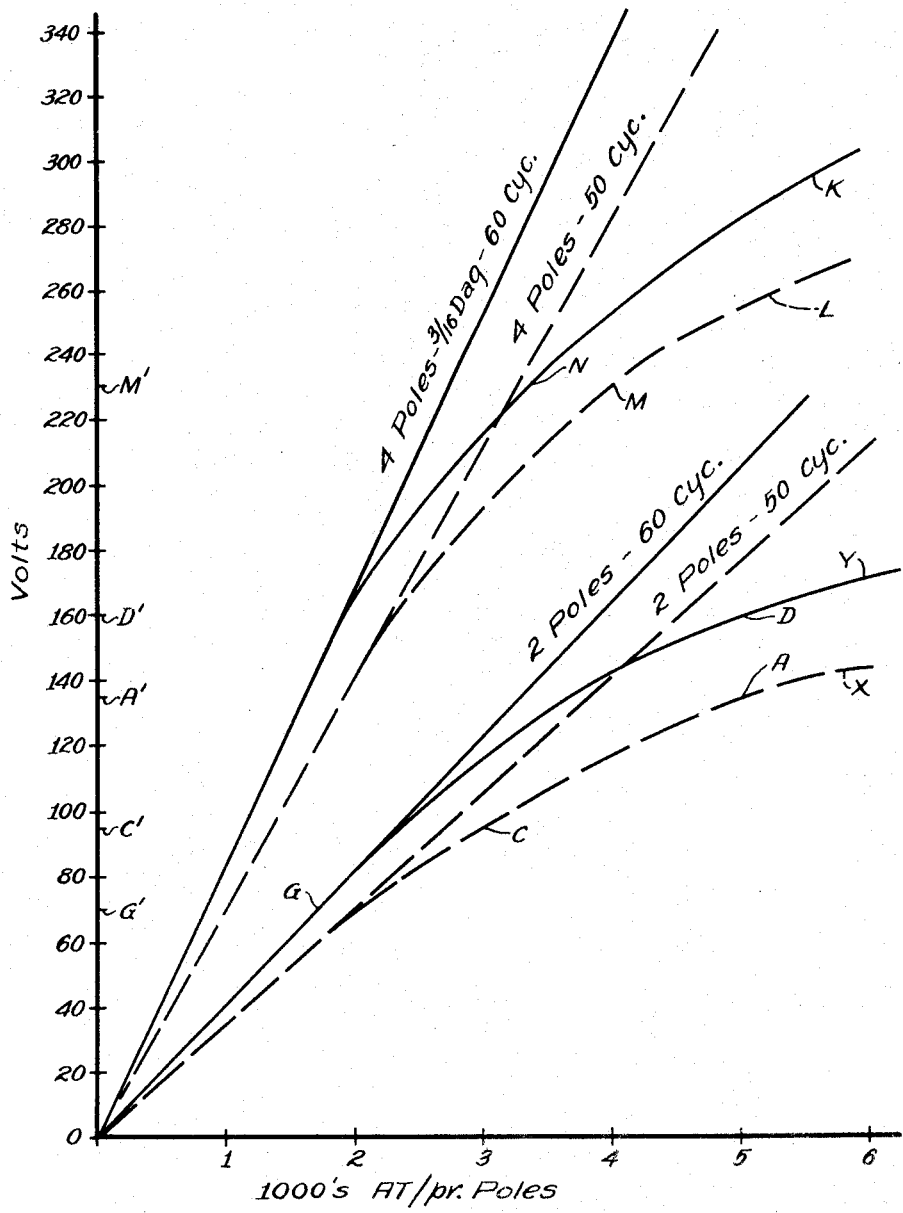
Fig. 6 is a showing of the saturation curves for a four-pole machine and a two-pole machine provided with our contribution to the art.

To explain this more in detail, let us suppose that the two upper pole pieces are operated at points of saturation. For 5000 ampere turns, from one of the curves, namely, curve V, on Fig. 6, considering the generator, or exciter E, is operated at 1450 R. P. M.—the 50 cycle operation—it is apparent that the top or saturated poles produce 135 volts, see points A and A'. Further, let the requirement be that the voltage between leads 1 and 5 is to be 230 volts.

Since 135 falls short of the 230 volts required by 95 volts, it is apparent that the bottom poles $S_2$ and $N_2$ must provide this additional voltage. From points C and C' corresponding to 95 volts on curve X, it is apparent that about 3000 ampere turns will be required in AF to provide the necessary additional voltage. The point, as point 17, on resistor R is then found to provide the proper total excitation.

When the exciter E is operated by a motor supplied with 60 cycles, that is, is operating at 1750 R. P. M. then it will be noted from curve Y that at 5000 ampere turns (see points D and D'), the top poles provide a voltage of 160 volts. The bottom poles thus must provide the difference of 70 volts. From points G and G', it is apparent that about 1700 ampere turns on field AF will suffice to give the exciter an output voltage of 230 volts.

For 50 cycle operation it will be noted that 5000 ampere turns and 3000 ampere turns, respectively, were used on the respective two pairs of poles or an average of 4000 per pair of poles. From point M on curve L, it is apparent that point M' is at about 230 volts, the desired voltage.

Similarly, for 60 cycle operation the average ampere turns is one-half of the sum of 5000 and 1700, or 3350 ampere turns. This number of ampere turns, from curve K, again produces about 230 volts, the desired voltage. See points N and M'.

A suitable point, as point 18, is thus determined on the resistor R to which the jumper 19 may be connected when the exciter is operating at the higher speed. The points 17 and 18 are determined at the factory and suitable leads brought out from the resistor. The terminals can be marked, respectively, 50 cycles, and 60 cycles. The transition from one supply frequency to another may thus be readily made in the field with a minimum of expense.

The resistor R, being external to the machine, is readily adjusted, as just explained, to the speed selected, and further is not affected by the changes in temperature of the exciter. Further, the total watts of energy to be dissipated by the resistor R is rather small since the flux supplied by poles $S_2$ and $N_2$ is small and because only two poles are in the resistor circuit. The resistor, therefore, need be but a small resistor.

The series field, or compounding field, is selected to have the proper compounding effect and the compounding field is placed on the poles that are operated saturated because the ampere turn value required to compound the machine is most nearly the same at either speed.

Since the poles $N_1$ and $S_1$ are always saturated the flux change due to temperature change is minimized. Since the external resistor R is not affected by changes in machine temperature, the flux in poles $N_2$ and $S_2$ is also not much affected by temperature changes. Temperature changes thus do not materially affect the output voltage.

While we have shown and described but one embodiment of our invention, we do not wish to be limited to this one showing but wish to be limited only by the scope of the claims hereto appended.

We claim as our invention:

1. In an electric system of control, in combination, a direct-current generator having a two-circuit armature but having standard magnetic circuits including standard pole pieces, field windings on the pole pieces, means for so exciting one half of the field windings, disposed on one half the pole pieces for producing a voltage in the armature circuit, that the pole pieces of the first half of the pole pieces are saturated, compounding windings on the saturated pole pieces, means for so exciting the other half of the field windings, disposed on the other half of the pole pieces for producing an additive voltage in the armature circuit, that the pole pieces of the second half of the pole pieces are not saturated, and means for altering the effect of the last-named means that the excitation of the pole pieces of the second half of the pole pieces may be altered in a sense opposite to changes in speed at which the generator may operate to thus provide a constant voltage output for different speeds.

2. In an electric system of control, in combination, a direct-current generator having a two-circuit armature but having standard magnetic circuits including standard pole pieces, a pattern field winding, having a constant impedance, connected to the armature terminals and being disposed on the pole pieces producing a voltage in the armature circuit, the impedance of the pattern field winding in relation to the rated voltage of the generator being such that the pole pieces on which the pattern field is wound are operated well above the knee of the saturation curve, a control field winding wound on the other pole pieces and producing an additive voltage in the armature circuit, an adjustable impedance connected in series with the control field, said control field and adjustable impedance being connected to the armature terminals of the generator, the impedance being normally so adjusted that the excitation of the pole pieces carrying the control field is well below the knee of the saturation curve, whereby compensation for changes in speed of operation of the generator may be effected by changing the impedance value in series with the control field in the same sense as the changes in speed.

3. In an electric system of control, in combination, a direct-current generator having a two-circuit armature but having standard magnetic circuits including standard pole pieces, a pattern field winding having a constant impedance connected to the armature terminals and being disposed on the pole pieces producing a voltage in the armature circuit, the impedance of the pattern field winding in relation to the rated voltage of the generator being such that the pole pieces on which the pattern field is wound are operated well above the knee of the saturation curve, a series compounding field wound on the same pole pieces carrying the pattern field windings, a control field winding wound on other pole pieces producing an additive voltage in the armature circuit, an adjustable impedance connected in series with the control field, said control field and adjustable impedance being connected to the armature terminals of the generator, the impedance being normally so adjusted that the excitation of the pole pieces carrying the control field is well below the knee of the saturation curve, whereby compensation for changes in speed of operation of the generator may be effected by changing the impedance value in series with the control field in the same sense as the changes in speed.

4. In an electric system of control, in combination, a four pole direct-current generator having a two-circuit armature but having standard magnetic circuits including standard pole pieces, a pattern field winding, having a constant impedance, connected to the armature terminals and being disposed on one pair of adjacent pole pieces for producing a voltage in the armature circuit, the impedance of the pattern field winding in relation to the rated voltage of the generator being selected to be such that the pole pieces on which the pattern field is wound are operated well above the knee of the saturation curve, a control field winding wound on the other pair of adjacent pole pieces for producing an additive voltage in the armature circuit, and means for varying the excitation of the control field with changes in speed so that a smaller additive voltage is produced in the armature winding for higher speeds of operation, and a higher additive voltage is produced in the armature windings for lower speeds of operation.

5. In an electric system of control, in combination, a four pole direct-current generator having a two-circuit armature but having standard magnetic circuits including standard pole pieces, a pattern field winding, having a constant impedance, connected to the armature terminals and being disposed on one pair of adjacent pole pieces for producing a voltage in the armature circuit, the impedance of the pattern field winding in relation to the rated voltage of the generator being selected to be such that the pole pieces on which the pattern field is wound are operated well above the knee of the saturation curve, a series compounding field wound on the same pole pieces carrying the pattern field windings, a control field winding wound on the other pair of adjacent pole pieces for producing an additive voltage in the armature circuit, and means for varying the excitation of the control field with changes in speed so that a smaller voltage is produced in the armature winding for higher speeds of operation, and a higher voltage is produced in the armature windings for lower speeds of operation.

WILLIAM R. HARDING.
MARTIN H. FISHER.

REFERENCES CITED

The following references are of record in the file of this patent:

UNITED STATES PATENTS

| Number | Name | Date |
|---|---|---|
| 608,309 | Steinmetz | Aug. 2, 1898 |
| 2,180,700 | Tisza et al. | Nov. 21, 1939 |
| 2,183,396 | Greer | Dec. 12, 1939 |
| 2,325,407 | Kaufmann | July 27, 1943 |